United States Patent
Misawa

(10) Patent No.: US 6,850,277 B1
(45) Date of Patent: Feb. 1, 2005

(54) SOLID-STATE IMAGE PICKUP APPARATUS WITH HIGH-SPEED PHOTOMETRY AND A SIGNAL READING METHOD THEREFOR

(75) Inventor: Takeshi Misawa, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/492,317

(22) Filed: Jan. 27, 2000

(30) Foreign Application Priority Data

Jan. 28, 1999 (JP) ............................................ 11-020028

(51) Int. Cl.[7] .......................... H04N 3/14; H04N 5/335; H04N 9/083; G03B 13/00

(52) U.S. Cl. ...................... 348/275; 348/349; 348/315; 250/208.1

(58) Field of Search ............................. 348/230.1, 315, 348/349, 354, 364, 208.12, 221.1, 229.1, 273, 275, 350, 358; 250/208.1

(56) References Cited

U.S. PATENT DOCUMENTS

| | | | | | |
|---|---|---|---|---|---|
| 4,876,590 A | * | 10/1989 | Parulski | ...................... | 348/281 |
| 5,177,614 A | * | 1/1993 | Kawaoka et al. | ........... | 348/319 |
| 5,363,137 A | * | 11/1994 | Suga et al. | .................. | 348/302 |
| 5,493,335 A | * | 2/1996 | Parulski et al. | .............. | 348/273 |
| 5,563,658 A | * | 10/1996 | Parulski et al. | .............. | 348/350 |
| 5,668,597 A | * | 9/1997 | Parulski et al. | .............. | 348/350 |
| 5,751,354 A | * | 5/1998 | Suzuki et al. | ................ | 348/349 |
| 6,075,565 A | * | 6/2000 | Tanaka et al. | ............... | 348/312 |
| 6,236,434 B1 | * | 5/2001 | Yamada | ....................... | 348/315 |
| 6,342,921 B1 | | 1/2002 | Yamaguchi et al. | | |
| 6,452,632 B1 | * | 9/2002 | Umeda et al. | ............... | 348/294 |
| 6,496,224 B2 | * | 12/2002 | Ueno | .......................... | 348/322 |
| 6,583,818 B1 | * | 6/2003 | Toma | .......................... | 348/312 |
| 6,744,466 B1 | * | 6/2004 | Furumiya | .................... | 348/273 |

FOREIGN PATENT DOCUMENTS

| | | |
|---|---|---|
| JP | B2431231 | 5/1992 |
| JP | A677450 | 3/1994 |
| JP | A10136391 | 5/1998 |

* cited by examiner

Primary Examiner—Wendy R. Garber
Assistant Examiner—John M. Villecco
(74) Attorney, Agent, or Firm—Birch, Stewart, Kolasch & Birch, LLP.

(57) ABSTRACT

A solid-state image pickup apparatus with a shortened signal reading out time in performing, for example, a light measurement control even in an application in which photosensitive cells are highly integrated, and a method of reading out a signal. With a digital still camera, in a mode set by a mode setting section, a system control section controls a drive signal generator to generate a drive signal. Light from an objective imaging field is incident onto an image pickup device through a color separation filter having color filters at least one of three separated colors arranged in a column direction. The image pickup device photoelectrically converts the incident light by each of photosensitive cells incorporated therein, receives the drive signal on a signal reading out gate, and performs a transfer of signal charge. A signal reading out only for the one of separated colors is in turn performed taking account of the arrangement of the color filter segments of color separation filter.

8 Claims, 17 Drawing Sheets

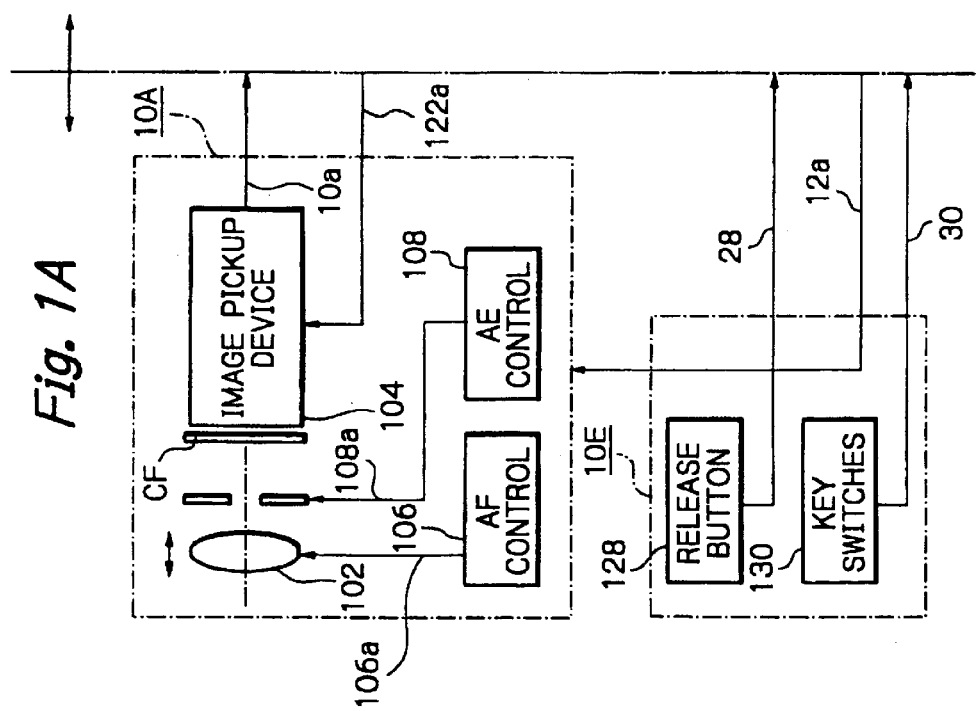

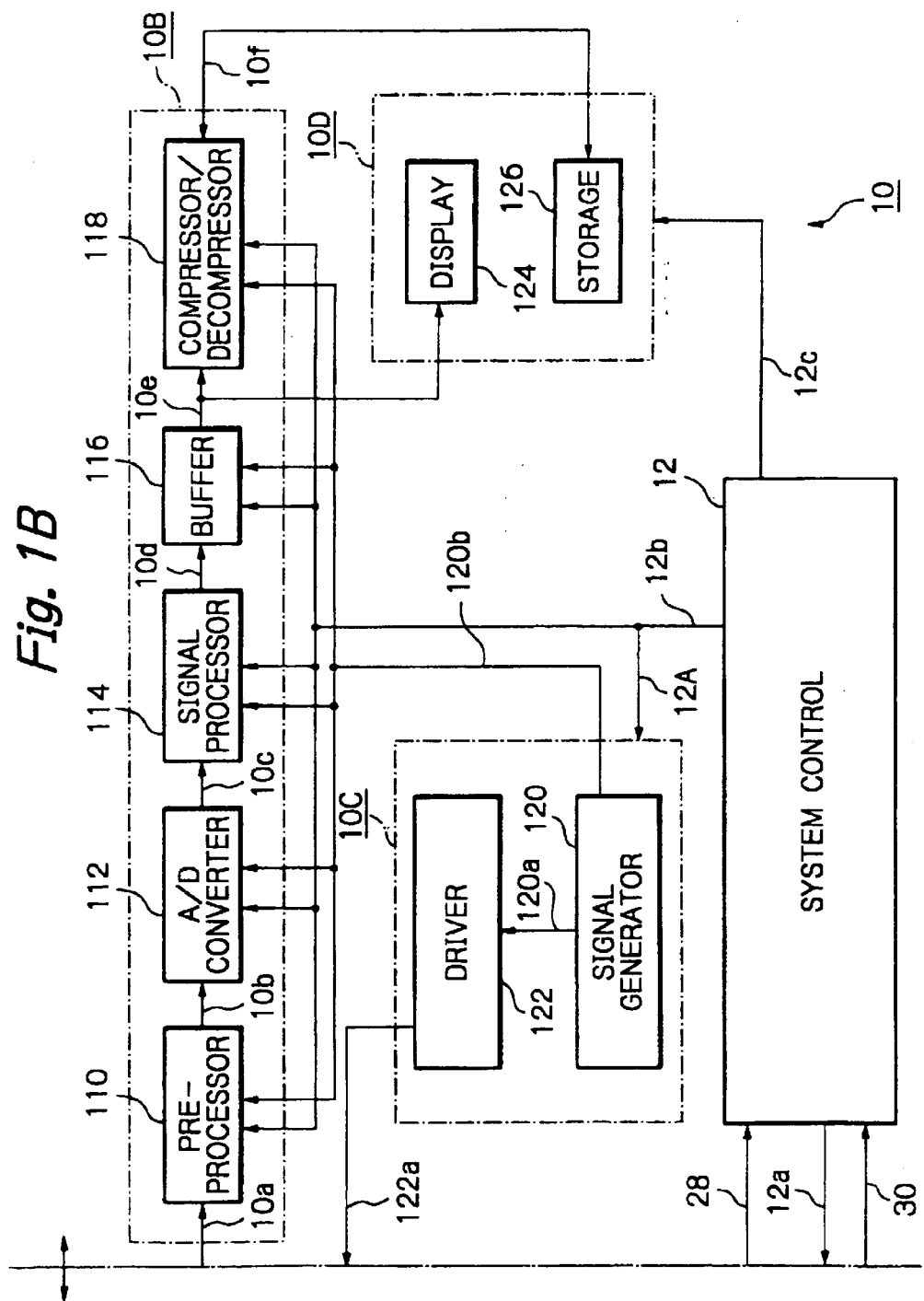

SOLID-STATE IMAGE PICKUP APPARATUS WITH HIGH-SPEED PHOTOMETRY AND A SIGNAL READING METHOD THEREFOR

BACKGROUND OF THE INVENTION

1. Field of the Invention

The present invention relates to a solid-state image pickup apparatus with high-speed photometry and a signal reading method therefor, more particularly to a solid-state image pickup apparatus, which includes an array of photosensitive cells integrated in higher density and arranged obliquely adjacent to each other, that is, in the so-called honeycomb structure having the lines or rows of cells offset from each other by a length equal to the half of the pitch of the cells in line or row, to accomplish an increased resolution, and which is advantageously applicable to an electronic still camera, an image input apparatus and the like.

2. Description of the Background Art

With reference to a solid-state image pickup apparatus taking the so-called honeycomb arrangement, various kinds of proposals have been disclosed in Japanese patent publication No. 31231/1992, Japanese patent aid-open publication Nos. 77450/1994 and 136391/1998. In Japanese patent publication No. 31231/1992, first electrodes meander along photosensitive cells which are arranged in the offset manner, so as to form a wavy shape pattern, and second electrodes are formed in another wavy pattern opposite in phase to the former. Other photosensitive cells are arranged in a region where the first and second electrodes separate so as to enable a signal to be read out from each cell via means for selectively coupling with the second electrodes, in response to an enable signal supplied to the first electrode, thus further increasing the resolution and the sensitivity of the solid-state image pickup apparatus from conventional. In the publication, the photosensitive cells are exemplified as being formed in an octagonal pattern.

In Japanese patent laid-open publication No. 77450/1994, the shape of photosensitive cells is formed as a square which is one of diamond shapes, and each side thereof forms an angle of 45 degrees in a vertical direction, so that its aperture ratio is made to be high, thus miniaturizing the solid-state image pickup apparatus. Particularly, by adopting a honeycomb arrangement, an increase in a vertical resolution is achieved. Moreover, a micro-lens is disposed on each photosensitive cell, thus increasing a light receiving efficiency.

In Japanese patent laid-open publication No. 136391/1998, meandering charge transfer devices of two lines are arranged between photoelectric conversion devices in a column direction, which are disposed so as to be adjacent to each other in the same row and relatively shifted by approximately the half of the interval between themselves in the adjacent rows, and the charge transfer devices are used for transferring the charge from the photoelectric conversion devices obliquely adjacent to each other. A spurious signal aliasing such as moiré is suppressed while achieving a high-density integration of the photoelectric conversion devices and an increase in a photoelectric conversion efficiency.

In the foregoing Japanese patent publication No. 31231/1992 and Japanese patent laid-open publication No. 77450/1994, attention is paid only to the structure of the device in aiming at a high-density integration. Moreover, in Japanese patent laid-open publication No. 136391/1998, descriptions for the structure and the shape of the device and the positional relation of the color filters are made. Then, descriptions of whole-pixel reading out using these relations are made.

By the way, it is understood that a high-density integration time for a reading out of signal charge obtained by a photoelectric conversion. For example, in a mode of controlling a light measurement or a photometry in which an automatic focus adjustment (AF) and an automatic exposure (AE) control are performed, there are demands for shortening a time required for reading out the signal charge and for finishing a preparation for an image pickup without delay. For photosensitive cells, the high-density integration of the image pickup devices and shortening of the time of the signal reading out are antinomic demand, which are contradictory to each other.

Particularly, when the signal is read out from the photosensitive cells adopting a honeycomb arrangement in the mode of controlling a light measurement, a breakthrough by a different method from conventional methods is needed.

SUMMARY OF THE INVENTION

It is therefore an object of the present invention to provide a solid-state image pickup apparatus free from the drawbacks of the background arts and short in a time of a signal reading out in the case of a light measurement control in spite of a high-density integration of image pickup devices, and a signal reading out method therefor.

According to a solid-state image pickup apparatus of the present invention, in a mode set by a mode setting section, a system control section controls a drive signal generator to generate a drive signal. Light from an objective imaging field is incident onto an image pickup device through a color separation filter having at least three separated colors, color filters of at least one of the separated colors being arranged in the column direction. The image pickup device photoelectrically converts the incident light by each of photosensitive cells incorporated therein, receives the drive signal on a signal reading out gate, and performs a transfer of signal charge. A signal reading out only for the one separated color is in turn performed taking account of the arrangement of the color filter segments of color separation filter. Thus, in the case of a high-density pixel integration, a time required for reading out the signal is shortened. When a signal is read out from the image pickup device and information on the automatic focus AF, for example, is detected, time required for the signal reading out, which was taken too much in the past, can be avoided. Use of an optical sensor and the like dedicated for a light measurement is made unnecessary.

According to the method of a signal reading out, one of whole-pixel reading out mode of reading out signal charge of at least three separated colors and the specifying reading out mode of reading out the signal charge only of one of the separated colors is selected, and in response to this selection a drive signal is generated for operating image pickup device at a predetermined timing, which is used for reading out signal charge. A destination supplied with the drive signal is selected, to which the drive signal is in turn supplied. Moreover, incident light is respectively separated to at least three colors, and the incident light which was subjected to the color separation in the color separation step is received by a plurality of photosensitive cells. After this image pickup step, in a specifying reading out mode, the signal charge read out only from the photosensitive cells corresponding to the one separated color among the plurality of photosensitive cells, undergoes a field shift by the drive signal, and then obtained signal charge is transferred in a column direction. The signal charge is then transferred in a horizontal direction after having repeated line shift of the signal charge. Thus, compared to the signal reading out in the whole-pixel reading out mode, the signal charge is read out only from the photosensitive cell of the specified one of the separated colors, thus significantly reducing time required for the signal reading out. For example, this method can be used in controlling a light measurement of the AF even in an application in which pixels are arranged with a high-density integration.

BRIEF DESCRIPTION OF THE DRAWINGS

The objects and features of the present invention will become more apparent from consideration of the following detailed description taken in conjunction with the accompanying drawings in which:

FIG. 1 shows a way how to combine FIGS. 1A and 1B with each other;

FIGS. 1A and 1B are block diagrams showing a schematic constitution of a solid-state image pickup apparatus according to the present invention when the solid-state image pickup apparatus is applied to a digital still camera;

DESCRIPTION OF THE PREFERRED EMBODIMENTS

Figure 2:
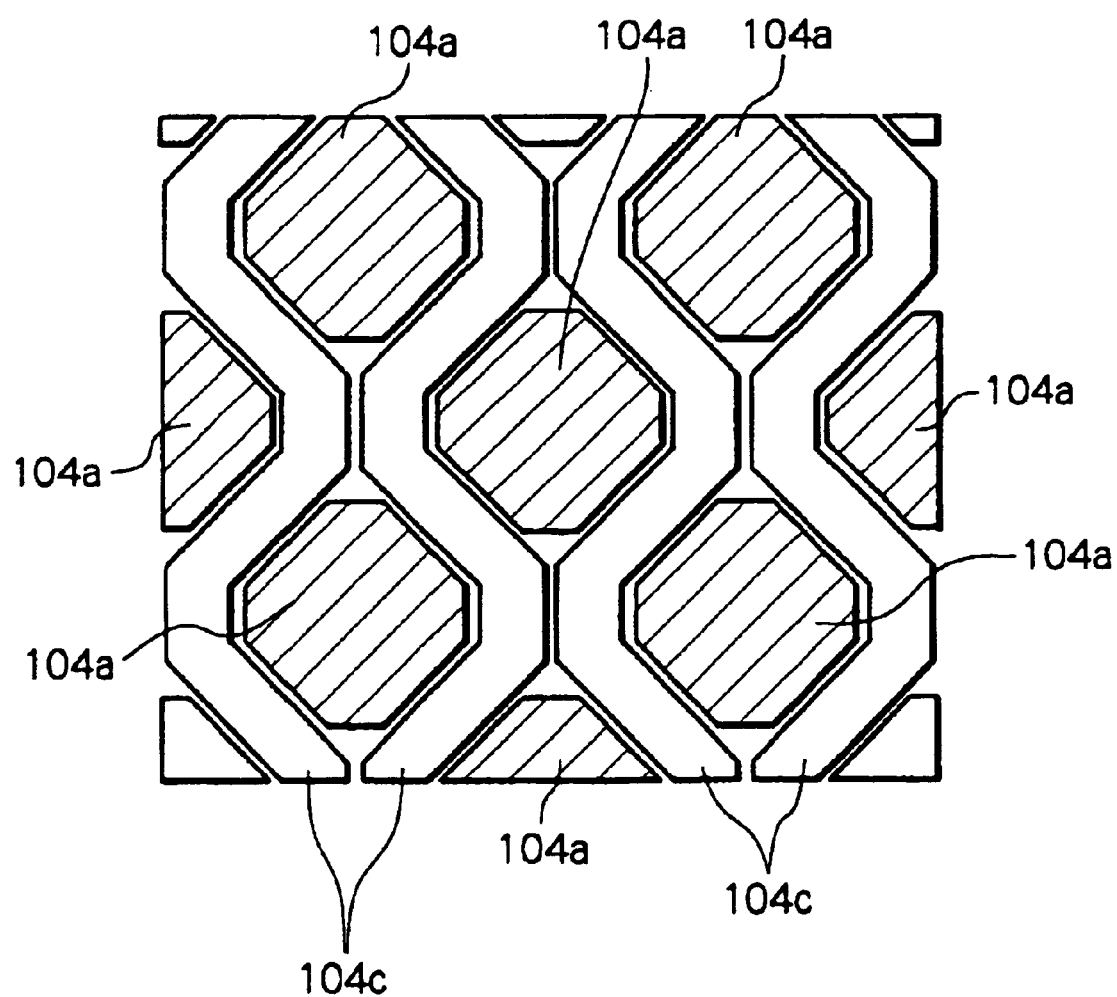
FIG. 2 is a schematic plan view useful understanding the relationship between the vertical transfer paths and photosensitive cells arranged in the form of a honeycomb in the image pickup device of FIG. 1A, when viewing from its light incident side.

Embodiments of a solid-state image pickup apparatus will be described with reference to the accompanying drawings below.

With a solid-state image pickup apparatus of the present invention in which an array of photosensitive cells is integrated in a high-density in the form of the so-called honeycomb arrangement, in order to meet the requirement for a high-speed operation of an automatic control of AF, the period of time required for reading out signals is further shortened in an image pickup device in which a plurality of photosensitive cells are arranged, from the time required for reading out all pixel signals by using only one color of at least three separated colors, more specifically in the embodiment by using only a color G among the primary colors RGB. Particularly, by specifying a signal reading out region for measurements, the solid-state image pickup apparatus is characterized in capacity of the signal reading out at further high-speed.

The application of the solid-state image pickup apparatus of the present invention to a digital still camera 10 will be described. Illustrations and descriptions for portions which have no direct pertinence to the present invention are omitted for simplicity. It should be noted that signals are designated by the same reference numerals as those connection lines on which the signals appear.

As shown in FIGS. 1A and 1B, the digital still camera 10 comprises an image pickup system 10A, a signal processing system 10B, a drive signal generation system 10C, a signal output system 10D, a mode setting section 10E and a system control 12.

The image pickup system 10A includes a optical lens 102, an image pickup device 104, an AF control 106 having a focus adjustment mechanism, and an AE control 108 having an aperture adjusting mechanism. In addition to these components, a shutter mechanism (not shown) for shielding incident light perfectly may be provided on the light incident side of the image pickup device 104. The optical lens 102 is adapted for receiving the incident light from an object field so as to focus the image of the object on a photosensitive array of the image pickup device 104.

The image pickup device 104 has a structure that a plurality of photosensitive cells 104a for performing a photoelectric conversion for the incident light supplied thereto are two-dimensionally arranged in row and column directions in a honeycomb-like manner so as to form a photosensitive array (FIG. 2). In the honeycomb-like structure, the respective photosensitive cells 104a are shifted or offset from other photosensitive cells obliquely adjacent thereto by a length equal to the half of the pitch thereof in the row and column directions. The honeycomb-like structure does not mean the shape of the photosensitive cell. It should be noted that the pitch means, for example, the distance between the centers of the adjacent two photosensitive cells in the row or column direction. In the image pickup device 104, on the surface of the photosensitive cells 104a, a single plate of color separation filter CF is formed integrally to separate colors of the incident light, which correspond to the respective photosensitive cells 104a.

Figure 3:
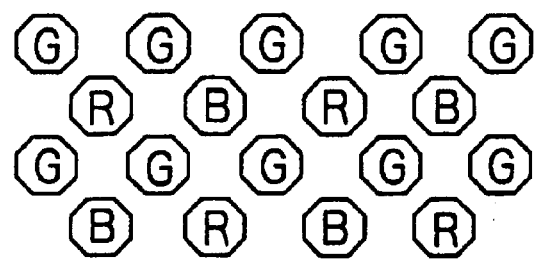
FIG. 3 is a schematic plan view showing an arrangement of color separating filters adopting a honeycomb type G square lattice RB complete checkered pattern, in which the color separation filters are arranged integrally with each other on the light incident side of the image pickup device shown in FIG. 1A.

By the arrangement of filter segments in the color separation filter CF, for example, the incident light which has been separated in color so as to possess attributions of the primary colors RGB is allowed to be incident onto the respective photosensitive cells 104a. This arrangement is shown in FIG. 3. The color separation filter CF is integrally formed as a part of the image pickup device 104. In FIG. 3, the three primary colors RGB are illustrated by symbols R, G and B expressing colors. In the arrangement of the color filter segments R, G and B shown in FIG. 3, the color G is arranged at the cross-points of a square lattice, and the colors R and B are arranged in an RB complete checkered pattern in which the same color filter segments are arranged diagonally interposing them between the color filter segments G. For this reason, this color filter arrangement is hereinafter called a honeycomb type G square lattice RB complete checkered pattern. The image pickup device 104 outputs an image pickup signal 10a to the signal processing system 10B.

In the illustrative embodiment shown and described above, the single plate of color separation filter CF is of the honeycomb type G square lattice RB complete checkered pattern composed of the RGB filter segments. The present invention is however not restricted to the specific type of color filter described above but advantageously applicable to other filter systems of complementary colors, such as the honeycomb type G square lattice YeCy complete checkered pattern in which for the color filter segments R, G and B of the honeycomb type G square lattice RB complete checkered pattern, replaced are the color filter segments of Yellow Ye, green G and cyan Cy, respectively, and the honeycomb type Gray or W square lattice YeCy complete checkered pattern in which for the color filter segments Ye, G and Cy of the honeycomb type G square lattice YeCy complete checkered pattern, replaced are the color filter segments of Yellow Ye, gray Gray or white W, and cyan Cy, respectively.

Figure 4:
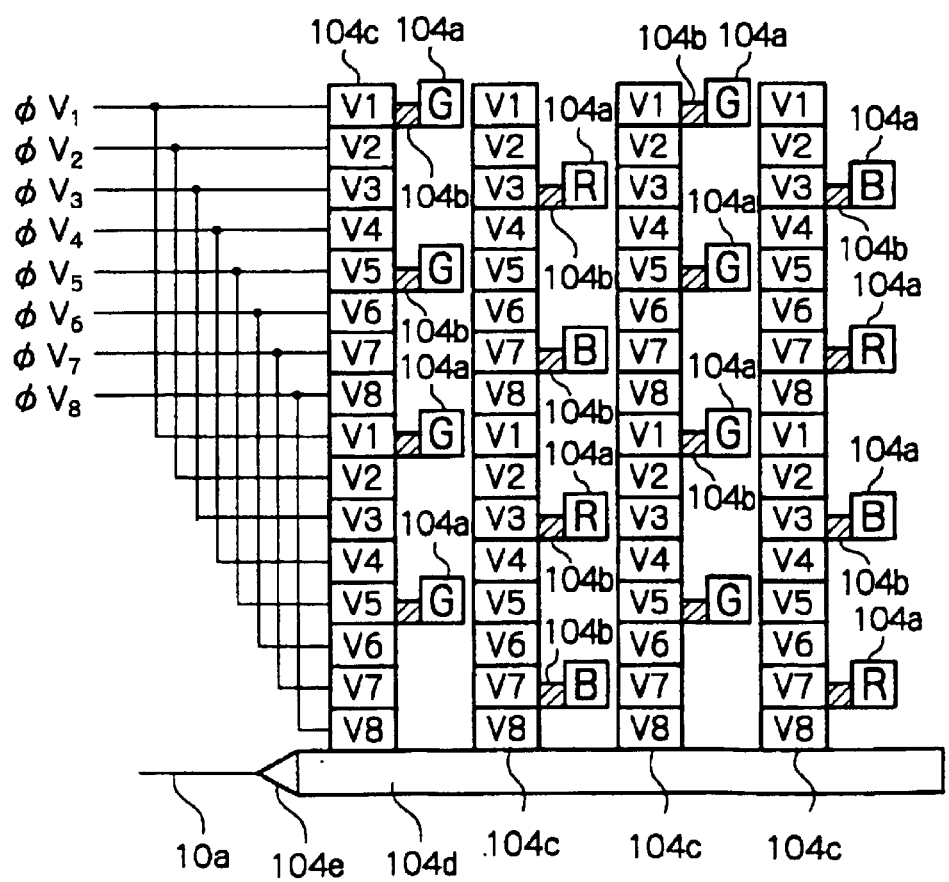
FIG. 4 is a schematic plan view showing the connections of the photosensitive cells, signal reading out gates, transfer devices on the vertical transfer paths and horizontal transfer paths, and drive signals supplied to them.

The constitution of the image pickup device 104 will be further described. The image pickup device 104 operates in response to a drive signal 122a output from the drive signal generation section 10C. Each of the photosensitive cells 104a is constituted by a charge coupled device (hereinafter referred to as CCD). As shown in FIG. 4, each of the photosensitive cells 104a is provided with d signal reading out gate or transfer gate 104b connected to a transfer device adjacent thereto, specifically the vertical transfer device. The signal reading out device 104b is adapted to block the signal charge converted from the incident light from leaking. The signal reading out gates 104b transfer the signal charge from the photosensitive cells 104a to vertical transfer paths 104c in response to a field shift pulse supplied through the electrodes. The vertical transfer paths 104c transfer sequentially the signal charge read out in the column direction, that is, in the vertical direction. The signal charge is supplied to transfer devices in line direction, that is, horizontal transfer path 104d, through line shifting. In response to a drive signal, the horizontal transfer path 104d outputs this signal charge to the signal processing system 103 through an amplifier 104e as described above.

Here, in each of the vertical transfer paths 104c, three transfer devices are disposed between adjacent two of the photosensitive cells 104a when viewing in the vertical direction (column direction). The four transfer devices, including the transfer devices connected to the associated signal reading out gates 104b, are used for transferring data of a pixel in one line. Thus, it is proved that four-phase drive signals are supplied as the drive signal for one line transfer. Each of the signal reading out gates 104b is disposed between one of the photosensitive cells 104a and one of the vertical transfer paths 104c.

Furthermore, since the arrangement of the photosensitive cells in the honeycomb-like manner is adopted in which the respective photosensitive cells are shifted from other photosensitive cells obliquely adjacent thereto by the half of pitch in the row and column directions, between adjacent two vertical transfer devices 104c in question, the signal reading out gates 104b are disposed in such a manner that one is shifted from the other in the vertical direction by a distance equal to the two transfer devices of the vertical transfer paths 104b.

Specifically, when the relation in the arrangement between the two vertical transfer paths 104c is observed, the photosensitive device of color G corresponds in level to the vertical transfer device V1 in the vertical direction, the photosensitive device of color R to the vertical transfer device V3, the photosensitive device of color G to the vertical transfer device V5, and so on. The basic constitution of the image pickup device 104 has been described above. With such constitution, the whole-pixel reading out is performed normally. Thus, the signal charge of all of the photosensitive cells is read out at a time.

Returning to FIG. 1A, the AF control 106 adjusts the focal position of the optical lens 102 so as to be brought at the optimum position in accordance with information obtained by measuring the distance between an object and the camera 10 by the focus adjustment mechanism (not specifically shown). At this time, an estimation of the information concerning the distance measurement and a control amount from the information concerning the distance measurement are processed by the system control 12. As a result, in response to the control signal 12a supplied, the AF control 106 drives the focus adjustment mechanism in response to the drive signal 106a, so as to move the optical lens 102 along its optical axis in the direction of the arrow A.

Furthermore, the AE control 108 permits the aperture or iris of the aperture mechanism to be displaced under the control of an exposure control (not shown) provided in the system control 12 adapted to estimate the amount or intensity of the measured light from the object field including the object, thus adjusting the amount of luminous flux incident onto the photosensitive array. The measurement of light is performed using a part of the image pickup signal. Also in this case, the exposure amount is calculated by the system control 12, based on the amount of measured light. The system control 12 supplies to the AE control 108 the control signal 12a for use in controlling the aperture value and the shutter speed value so as to mate with the calculated exposure amount. The AE control 108 supplies a drive signal 108a to the aperture mechanism and the shutter mechanism in response to the control signal 12a so as to adjust those mechanisms to the aperture value and the shutter speed value. This adjustment will optimize the exposure.

The signal processing system 10B of FIG. 1B comprises a pre-processor 110, an A/D converter 112, a signal processor 114, a buffer 116 and a compressor/decompressor 118. The pre-processor 110 performs, for example, a correlated double sampling (CDS) for signal charge 10a supplied thereto to reduce noises, and performs a gamma correction for the signal 10a. The pre-processor 110 amplifies the signal 10a. Thus, the amplified signal 10a is output to the A/D converter 112.

The A/D converter 112 samples the analog signal 10b supplied from the image pickup device 104 through the pre-processor 110, in response to a clock signal 120b supplied from the signal generator 120, which generates also a timing signal 120a, and using the control signal 12b from the system control 12, and quantizes the analog signal 10b, thus converting the signal 10b to a digital signal 10c. The resultant digital signal 10c is supplied to the signal processor 114.

The signal processor 114 performs the automatic exposure control, the white balance control (AWB: Automatic White Balance control) and the aperture correction for the signal 10c supplied, and then performs a signal processing in accordance with the two modes. Specifically, these two modes are directed to the modes set by a shutter release button 128 of a mode setting section 10E, described later, namely, a still picture shoot mode in which an obtained still image data is transferred to a storage 126 of a signal output system 10D, and simply a light control mode in the automatic focusing (AF) of the image pickup system 10A. A gamma correction may be performed in this stage or in a later stage.

In the digital still camera 10, which mode is to be selected is controlled by the control signal 12b from the system control 12. In the still picture shoot mode, under the control of the system control 12, the signal processor 114 performs a digital signal processing, such as the broadening of the band of the luminance signal on the signal which has been undergone the foregoing signal processing.

On the other hand, in the mode of controlling a light measurement, taking into account that the supplied signal 10c is digital, the system control 12 is adapted to perform a control such that the signal from the image pickup device 104 is read out faster than the conventional reading-out rate, and process the signal read out. In addition, the vertical thinning down of the lines is performed so as to allow the display 124 of the signal output system 10D to display the image representative of the image signal. The signal processor 114 performs a signal processing in the still picture shoot mode so as to convert the digital image signal 10c to a recordable video signal. Then, the signal processor 114 outputs to the buffer 116 the signal 10d in the mode in which a display/record is selected.

The buffer 116 has a function to amplify the video signal 10d supplied from the aforementioned signal processor 114 with a predetermined gain as well as to perform a control on its time axis in recording. Under the control of a recording control (not shown) arranged in the system control 12, the buffer 116 outputs the picture signal 10e either to the signal output system 10D or to the compressor/decompressor 118 or both.

In recording the picture, the compressor/decompressor 118 takes a picture signal 10e thereinto in response to the control signal 12b of the system control 12. The supplied picture signal 10e undergoes a compression based on, the Joint Photographic coding Experts Group (JPEG) standard, for example. When the signal 10f recorded is read out from the storage 126, the signal 10f is subjected to a signal processing such as a conversion reverse to the foregoing compression processing, whereby the original picture signal is reproduced. The restored picture signal (not shown) is supplied to the display 124 and displayed thereon.

The drive signal generation section 10C includes the signal generator 120 and a driver 122. The signal generator 120 generates synchronous signals 120b based on clock signals locally oscillated so as to drive the digital still camera 10 in, for example, a present broadcast system (NTSC/PAL) and supplies the signal 120b to the signal processor 114. The signal generator 120 supplies the signal 120b as clock signals for use in generating a sampling signal and a read/write signal to the pre-processor 110, the A/D converter 112, the buffer 116 and the compressor/decompressor 118.

The signal generator 120 generates the synchronous signals from the locally oscillated clock signals, and, using these signals, generates a variety of timing signals 120a. The generated timing signals 120a include timing signals used for reading out the signal charge excited in the image pickup device 104, such as, vertical timing signals which define timings for driving the vertical transfer paths, horizontal timing signals which define timings for driving the horizontal transfer paths and timing signals which are used to perform field shift and line shift. Moreover, the signals from the signal generator 120 are also used for controlling operations of the AF CONTROL 106 and the AE CONTROL 108. The lines conveying those signals are not illustrated apparently.

Thus, the various kinds of signals are output to the foregoing circuit components, and the signal generator 120 supplies the vertical timing signals and the horizontal timing signals to the driver 122. When the control signal 12b in the mode of controlling a light measurement (photometry mode) is supplied from the system control 12 to the signal generator 120, the signal generator 120 supplies a signal for elevating the substrate voltage of the photosensitive cells, that is, an overflow drain voltage for the photosensitive cells of the colors R and B, according to demand, for example, in the mode of controlling a light measurement. The supply of the signal can bring the photosensitive cells of the color R and B to the state as if the signal charge would not be generated.

Furthermore, in the photometry mode, the signal generator 120 generates a transfer gate signal so as to read out the signal charge only in the photosensitive cell of the color G. When the photometry mode is selected, the signal generator 120 switches selectively the timing signals responsive to the control signal 12b from the system control 12.

The driver 122 generates the drive signal 122a at the timings supplied. The rate of reading out the signal is generally changeable in such a manner that a vertical drive signal output from the driver 122 in accordance with the mode selected is supplied to the image pickup device 104 so as to perform, for example, a drive for the whole imaging area, a drive for selected colors and a drive for specified colors and region. The driver 122 supplies to the image pickup device 104 the drive signal 122a which is generated associatedly when the photometry mode is selected in particular and performs the drive for the whole image area, the drive for the selected color and the drive for the specified the colors and region to thereby change the reading out rate of the signal.

The driver 122 outputs the drive signal 122a which defines to the timings when the mode is set to the photometry mode. In an application where the level of the drive signal is changeable in accordance with the mode, a level switch is provided to change the level of the drive signal. Generally, the voltage level to be set is, for example, 1V, 5v, 8V and 12V. The driver 122 generates the drive signal 122a in response to the timing signal 120a supplied from the signal generator 120. The driver 122 generates a tri-level drive signal including the vertical timing signal and the transfer gate signal.

The signal output system 10D includes the display 124 and the storage 126. In the display 124, a liquid crystal display monitor of the VGA (Video Graphics Array) standard supplied with inputs of digital RGB signals is provided. The storage 126 is adapted to store the video signal 10f supplied to a magnetic recording medium, a semiconductor memory used for a memory card, an optical recording medium or a magneto-optical recording medium. Moreover, the storage 126 is also capable of reading out the video signal 10f thus stored so to be displayed on the display 124. With the type of storage 126 in which the recording medium is detachably mounted the recording medium may be detached so as to reproduce the video signal recorded on the recording medium by an external apparatus to display and/or print the picture.

The mode setting section 10E includes a release button 128 and key switches 130. In this embodiment, a two-stroke button mechanism is provided in the release button 128. Specifically, in the half-depressed state as the first stroke, the photometry mode is set to develop a signal representing the photometry mode set to the system control 12. In the fully-depressed state as the second stage, the signal defining the timing for taking the picture is supplied to the system control 12 to notify the system control 12 of fact that the picture recording mode, or the still picture shoot mode, was selected. The settings of these modes are reported to the system control 12 on a signal line 28. Furthermore, when the shutter release button 128 is in its state of powering the camera 10 on and a switch (not shown) of the image monitoring display is in its ON state, the system control 12 based on the signal supplied through the release button 128 controls the display 124 so as to display a moving picture in the moving picture mode.

The key switches 130 is a cross-shaped key, which selects items and picture images by moving a cursor in all directions (e.g. up-/down-ward/right-/left-ward), which is displayed on the screen of the display 124. The selected information is also sent to the system control 12 on a signal line 30.

The system control 12 is adapted for controlling the general operation of the camera. The system control 12 includes a central processing unit (CPU). The system control 12 decides, based upon the input signal 28 from the release button 128, which mode is selected. Furthermore, the system control 12 controls the processing on the picture signal of the camera by selection information 30 from the key switches 130. Based on the supplied information, the system control 12 controls the operation of the drive signal generation section 10C based on the supplied information. The system control 12 includes a recording control (not shown). The recording control controls operations of the storage 126 of the signal output system 10D and the buffer 116 in response to a timing control signal 12c from the system control 12.

Figure 5:
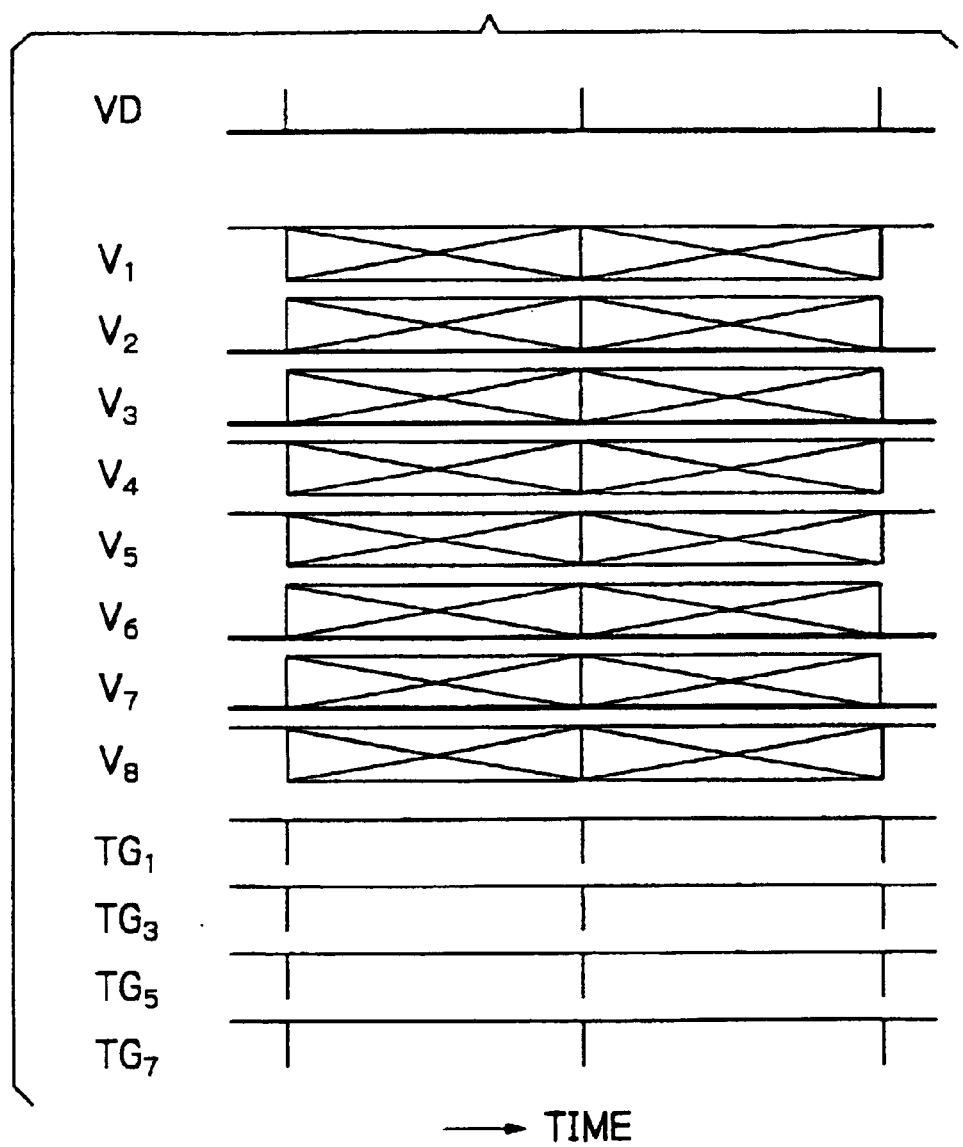
FIG. 5 is a timing chart showing a vertical synchronous signal, a vertical timing signal and a transfer gate signal when a whole-pixel reading out is performed by the drive signal generator shown in FIG. 1B.

The operation of the digital still camera 10 constructed as described above will be described. First, in the operation of the whole-pixel reading out normally performed, since the digital still camera 10 is usually of the type having the image pickup device 104 capable of the whole-pixel reading out, the notification of the still picture shoot mode set from the release button 128 allows incident light passing through the color separation filters CF arranged in the honeycomb type G square lattice RG complete checkered pattern to be received by entire photosensitive cells 104a. Upon receipt of the incident light, each of the photosensitive cells 104a converts the photoelectric charge excited by the incident light to store the signal charge therein. In order that the stored signal charge is read out from each of the photosensitive cells 104a, the signal generator 120 generates the vertical synchronous signal VD as shown in FIG. 5. Furthermore, the signal generator 120 generates vertical timing signals $V_1$ to $V_8$ supplied to transfer devices V1 to V8 of the vertical transfer path 104c in synchronization with the vertical synchronous signal VD ard transfer gate signals $TG_1$, $TG_3$, $TG_5$ and $TG_7$ supplied to the signal reading out gate 104b. In FIG. 5, it is schematically illustrated that during each of the vertical synchronous periods, the vertical timing signals $V_1$, $V_4$, $V_5$ and $V_8$ are negative signals, and the vertical timing signals $V_2$, $V_3$, $V_6$ and $V_7$ are positive signals. It is understood that the transfer gate signals $TG_1$, $TG_3$, $TG_5$ and $TG_7$ are generated so as to read out the signal charge in synchronization with the vertical synchronous signals VD input from the respective photosensitive cells.

Figure 6:
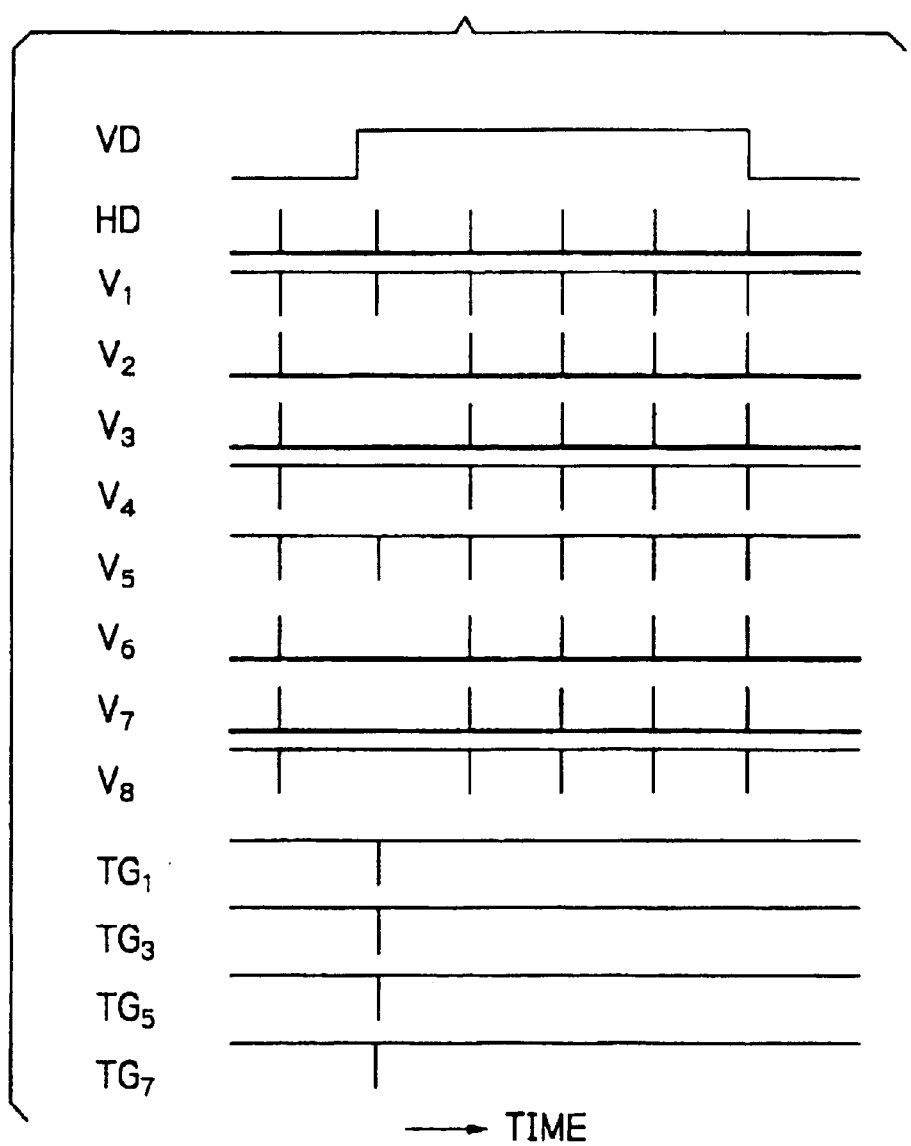
FIG. 6 is a timing chart showing the vertical synchronous signal, the vertical timing signal and the transfer gate signal with the leading edge portion of the vertical synchronous signal of FIG. 5 is depicted in an enlarged scale.

That timing relation, when depicted in an enlarged scale with respect to time is understood as shown in FIG. 6. Specifically, it is shown that in this stage, the signal charge is read out only from the photosensitive cells at the positions associated with the vertical timing signals $V_1$ and $V_5$ when the transfer gate is turned on, and a field shift is not performed until a next vertical synchronous signal VD is supplied (see also FIG. 5). Then, after the field shift, the vertical timing signal is sequentially supplied in synchronization with the horizontal synchronous signal HD. With this supply, the signal charge shifted to the vertical transfer path 104c is transferred toward the horizontal transfer path 104d.

Figure 7:
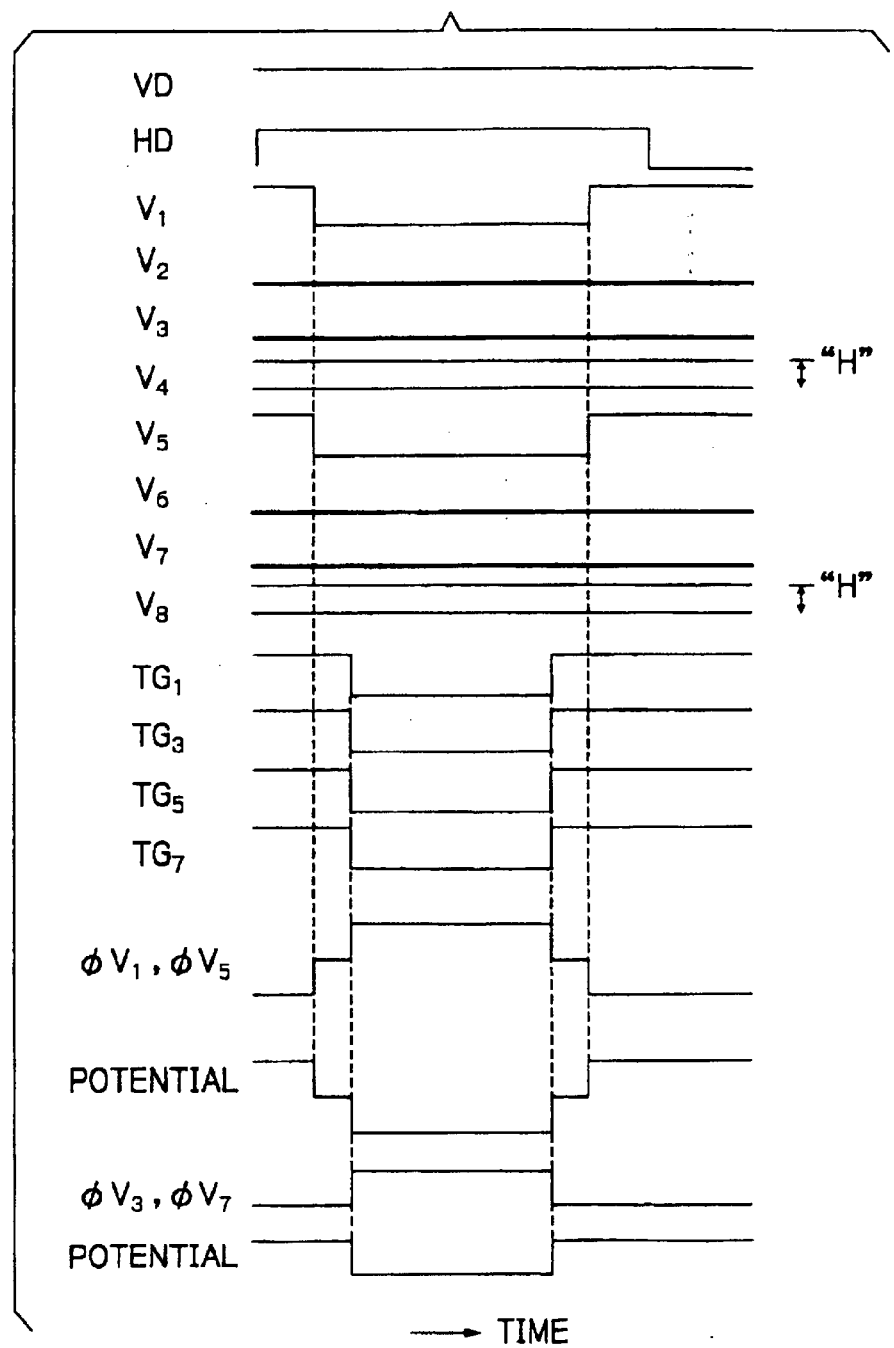
FIG. 7 is a timing chart illustrating the vertical synchronous signal, a horizontal synchronous signal, the vertical timing signal, the transfer gate signal, a drive signal and a potential generated by the drive signal in the vicinity of a leading edge portion of the horizontal synchronous signal shown in FIG. 6 in an enlarged scale.

The vertical timing signals and the transfer gate signals, following the vertical synchronous signal VD changed to its level "H" in the timing as shown in FIG. 6, and the horizontal synchronous signal HD gone positive thereafter are illustrated in FIG. 7, which is shown as enlarged with respect to time. Particularly, when the vertical timing signals V1 and V5 and the transfer gate signal $TG_1$ and $TG_5$ are supplied to the driver 122, vertical drive signals $\phi V_1$ and $\phi V_5$ shown in FIG. 7 are output to the image pickup device 104. Upon the output of the vertical drive signals $\phi V_1$ and $\phi V_5$, the potentials as shown in FIG. 7 are formed in the vertical transfer devices V1 and V5. Moreover, since the transfer gate signals $TG_3$ and $TG_7$ become the ON state thereof, the vertical drive signals $\phi V_3$ and $\phi V_7$ as shown in FIG. 7 are generated. Thus, the potentials are formed as shown in FIG. 7.

Figure 8:
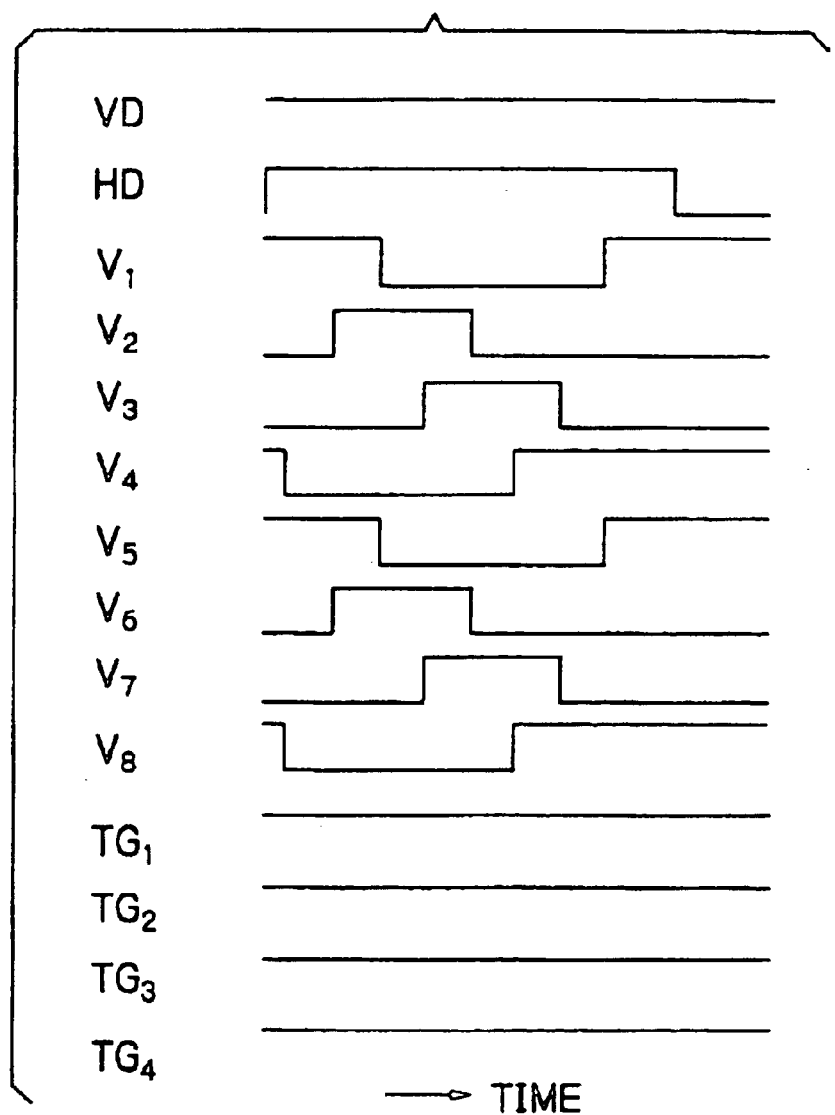
FIG. 8 is a timing chart useful for understanding the phase relationship between the vertical timing signals used for generating signals of a four-phase drive in the image pickup device shown in FIG. 1A.

Furthermore, the procedures in which the signal charge shifted to the vertical transfer path 104c is transferred toward the horizontal transfer path 104d are understood from the timing chart of FIG. 8. The vertical transfer path 104c is illustrated in the from of eight vertical transfer devices V1 to V8. It is found that there are two groups in the vertical drive signals, and the same signals are commonly supplied to the vertical transfer devices V1 to V4 and the vertical transfer devices V5 to V8. Specifically, the vertical transfer devices V1 to V4 and the vertical transfer devices V5 to V8 are driven by the four signals in different phases. The signal charge vertically transferred is subjected to the line shift, and thereafter the signal charge is sequentially on the horizontal transfer path 104d. Thus, the signal charge of all pixels is read out from the image pickup device 104 within a predetermined period at a time.

By the way, the general image pickup procedures in the digital still camera 10 will be described. In the digital still camera 10, a light measurement is first performed for an object field prior to an image pickup. At the time of photographing the object field, the release button 128 is made to be in its half-depressed state, thus setting the mode of controlling a light measurement. In this case, among signals obtained by the photoelectric conversion in the image pickup device 104 of the image pickup system 10A, the signals of the color G are taken out. This is because the automatic focusing (AF) can be controlled only by the information relating to the signal of the color G occupying about 70% of the luminance information. Furthermore, since the pixel information must be read out many times in the light measurement in the AF until a proper value is determined, there is a demand for reading out the signal charge as fast as possible.

On the other hand, when the controls for the AE and the AWB are performed, information relating all colors is required. Accordingly, reading out of the information relating to monochrome, that is, the color G, is purposeless. A high-speed reading out of the signals by the drive signal is performed when picking up an image, which will be later described in detail.

The picture signal 10a obtained by the image pickup system 10A during the light measurement is supplied to the signal processing system 10B in the form of the control signal 12a from the system control 12. The signal processing system 10B converts the supplied picture signal 10a to a digital signal. The image data obtained by the conversion is supplied to the system control 12 as light measurement information (not shown). The system control 12 performs a computation on this light measurement information. By this computation, the system control 12 generates an AF control signal (or control information) 12a, and outputs it to the AF control 106. The AF control 106 performs an adjustment in accordance with the supplied control signal 12a through its mechanism built therein. This adjustment is iterated in this mode.

Thereafter, the user changes the release button 128 to its fully-depressed state at a desired image pickup timing. In response, a signal for recording the image of the object in the object field is supplied to the system control 12. An image pickup with the incident light from the object field is carried out by the image pickup system 10A similarly to the previous mode. It should be noted that in the still picture shoot mode (the whole-pixel reading out), the signals of the colors RGB are taken in. Before this image pickup, a drive signal to be supplied is naturally different from that in the previous reading out of the signals. The picture signal 10a picked up is converted to a digital signal 10c by the A/D converter 112 of the signal processing section 10B, and then supplied to the signal processor 114.

The signal processor 114 processes the image data represented in the form of luminance and chrominance signals into the signals extending to a higher frequency. Then, the obtained image data is supplied to the compressor/decompressor 118 through the buffer 116. The compressor/decompressor 118 performs a compression processing, and produces a resultant signal 10f to the signal output system 10D. In the still picture shoot mode, the image data 10f of all pixels supplied under the control of the recording control section in the system control 12 is recorded in the storage 126. The storage 126 is also capable of reading out the recorded image data under the control of the recording control section.

As described above, the digital still camera 10 can operate both in the photometry mode and in the still picture shoot mode by the release button 128. In the case where the digital still camera 10 performs an image pickup with the large number of pixels exceeding, for example, a million, in the still picture shoot mode the time is not so critical which is required for reading out all pixels of the image pickup signals except for a continuous shooting. However, the mode of controlling a light measurement requires shortening a reading out time in performing the AF control as described above. In an application of digital still camera 10 using the image pickup system 10A accomplishing such requirements, operations of the image pickup device 104 and the drive signal generation section 10C in the mode of controlling a light measurement for the AF control will be described.

Figure 9:
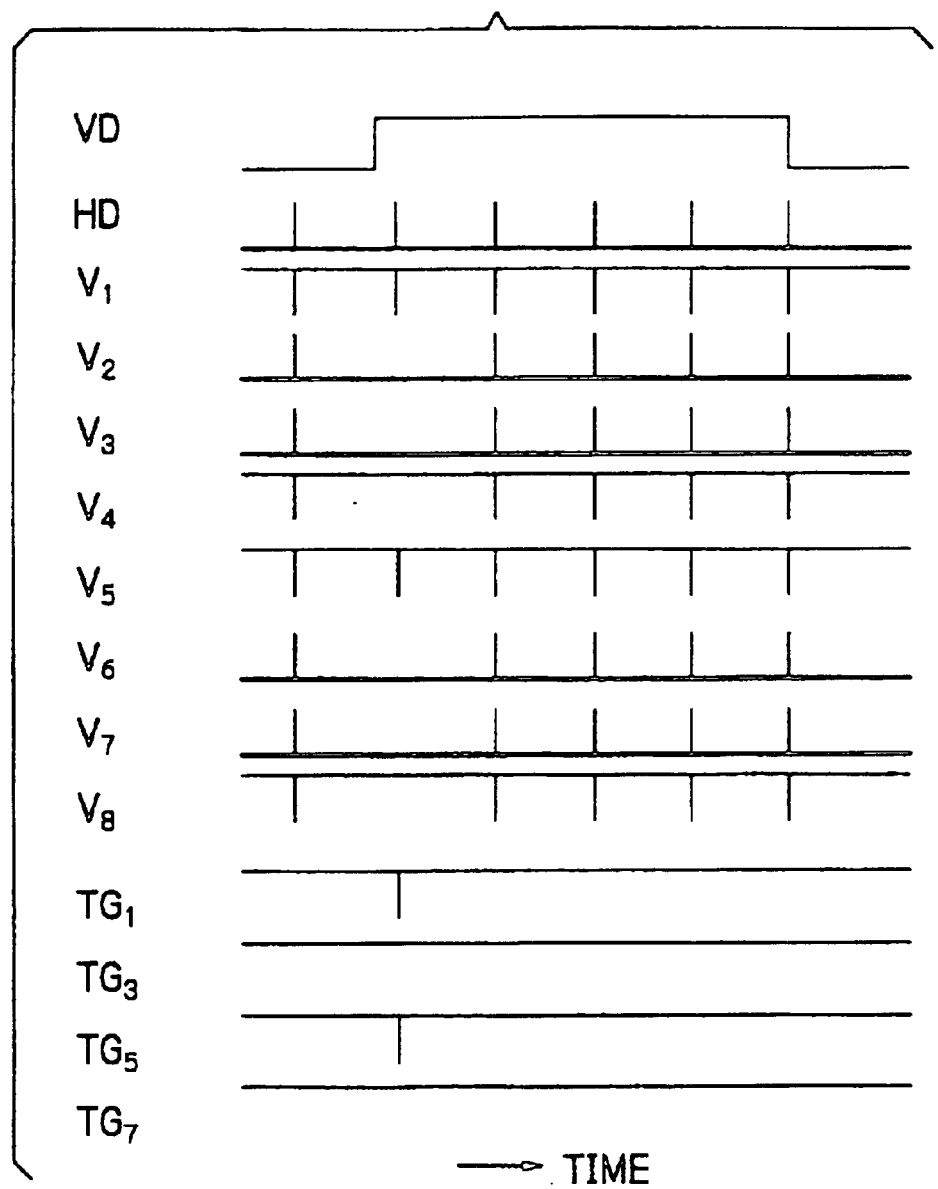
FIG. 9 is a timing chart depicting the vertical synchronous signal, the horizontal synchronous signal, the vertical timing signal and the transfer gate signal, which are generated by a signal generator when signal charge only for a color G is read out in the image pickup device shown in FIG. 1A in a mode of controlling a light measurement.
Figure 10A:
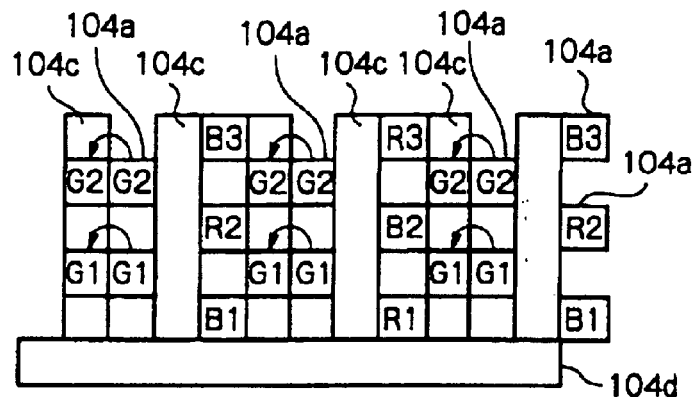
FIGS. 10A, 10B and 10C are schematic views showing the states of field shift, vertical transfer and horizontal transfer in reading out signal charge in response to a drive signal which is supplied based on the signal generated by the signal generator shown in FIG. 9.

Since the arrangement of the color separation filters CF adopts the honeycomb type G square lattice RB complete checkered pattern, it is understood that the photosensitive cells 104a of the color G are arranged to be adjacent to the vertical transfer devices V1 and V5 as is apparent in FIG. 4. When only the signal charge of the photosensitive cells of the color G occupying the larger part of the luminance information are read out, it suffices that the transfer gate signals $TG_1$ and $TG_5$ are supplied so as to turn on the signal reading out gates 104b adjacent to the vertical transfer devices V1 and V5. This timing relation is shown in FIG. 9. Since other transfer gate signals $TG_3$ and $TG_7$ are in the level "H" thereof, the signal reading out gates 104b adjacent to the vertical transfer devices V3 and V7 are kept disabled, and the signal charge of the photosensitive cells of the colors R and B cannot therefore be read out. The signal charge is read out from the photosensitive cells G1 and G2 onto the vertical transfer paths 104c in this timing relation, as shown in FIG. 10A. The signal charge read out onto the vertical transfer paths 104c is transferred to the horizontal transfer path 104d sequentially, as described above. At this time, all of the signal charges in the vertical transfer paths 104c are allowed to move downward by a transfer distance equivalent to two horizontal lines. As a result, the signal charge of the photosensitive cells G1 which are closest to the horizontal transfer path 104d is supplied to the horizontal transfer path 104d.

Figure 10B:
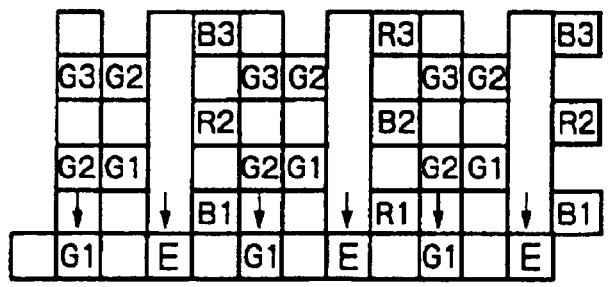

Accordingly, with respect to the signal charge of the photosensitive cells G1, the movement of the second one of the two lines is a line shift. Since the signal charges of the photosensitive cells of the colors R and B are not read out, transfer devices which would otherwise be supplied with these signal charges are illustrated by a symbol E (emptiness or lack of signal charge), see FIG. 10B.

Figure 11A:
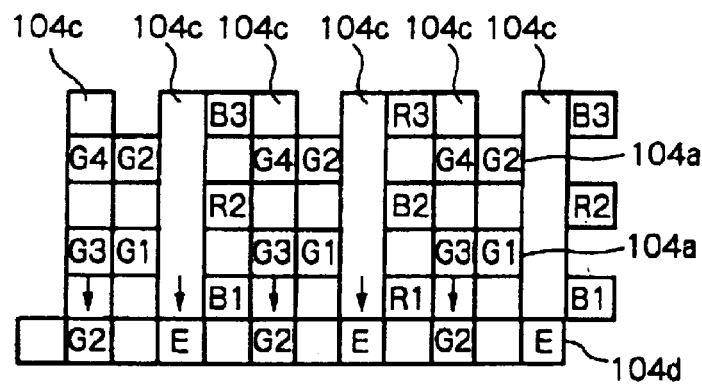
FIGS. 11A and 11B are schematic views showing the states of vertical transfer and horizontal transfer, which are performed after the signal reading-out of FIGS. 10A, 10B and 10C.
Figure 11B:
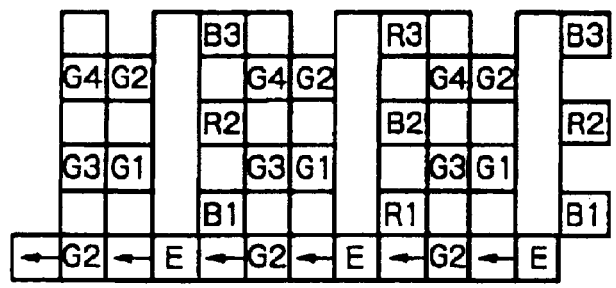

Next, the signal charges G1, E, G1, E, . . . , which arrived at the horizontal transfer path 104d, are transferred to the amplifier 104e (FIG. 4) arranged on the output side, and output therefrom, sequentially. Thereafter, all of the signal charges left in the vertical transfer paths 104c are made to move downward by a transfer distance equivalent to the two lines again (see FIG. 11A). Then, the signal charges G1, E, G1, E, . . . , which arrived at the horizontal transfer path 104d, are sequentially transferred to the amplifier 104e arranged on the output side, and output therefrom (see FIG. 11B).

Figure 12:
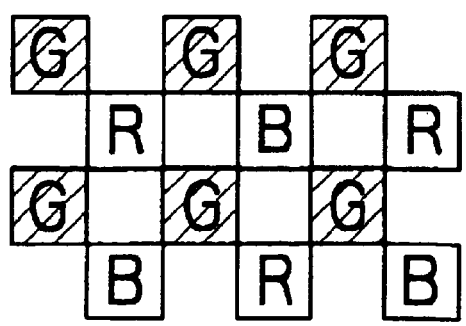
FIG. 12 is a schematic view useful for understanding the positional relationship between photosensitive cells from which the signal charge in FIGS. 10A through 11B is read out and photosensitive cells from which the signal charge in FIGS. 10A through 11B is not read out.

Only the signal charges of the photosensitive cells of the color G illustrated with the hatching in FIG. 12 are read out by the transfer of the signal charges. As is apparent from the arrangement of FIG. 12, the ½ thinning is performed by thinning every other one out of the photosensitive cells in the horizontal and vertical directions. However, in this arrangement in the honeycomb-like manner, the respective photosensitive cells are shifted from other photosensitive cells obliquely adjacent thereto by the half pitch in the row and column directions.

This implies that the number of the pixels actually read out is not equal to the number of the pixels by ¼ thinning when every other one out of the pixels is thinned in the horizontal and vertical directions. By performing no reading out operation of the signal charge to the vertical transfer device, the vertical transfer device expressed by the symbol E can be treated in the same manner as the transfer device to which the signal charge is actually transferred without any distinction.

Figure 10C:
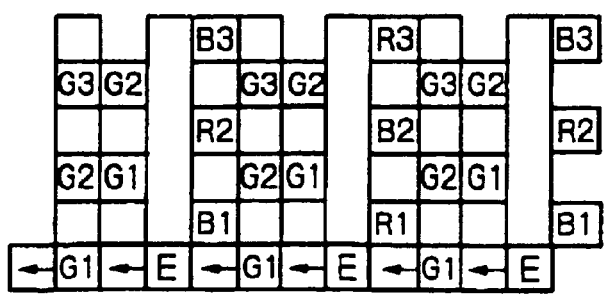

In other words, although the signal charge "E" can be neglected in the vertical transfer, the transfer is performed as if the signal charge "E" were treated as the charge "E" occupying the position of one transfer device in the transfer in the horizontal direction. For this reason, the number of the transfer stages in the horizontal direction is the same as where the thinning is not performed. (see FIG. 10C and FIG. 11B).

Figure 13A:
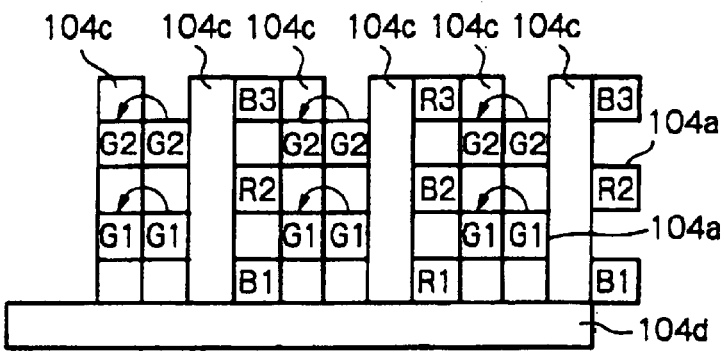
FIGS. 13A–13D are schematic views showing the states of vertical transfer and horizontal transfer in an improved procedure of thinning down lines of FIGS. 10A through 11B.
Figure 13B:
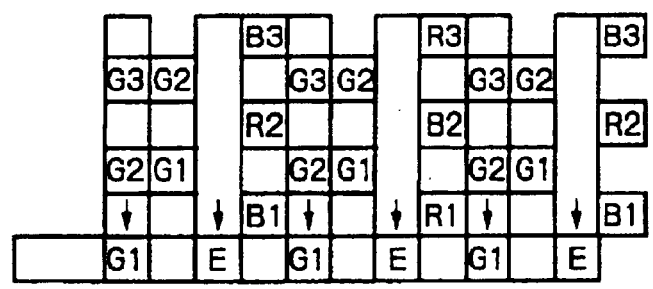

Accordingly, the reading out of the signal charge was investigated so that the number of the transfer stages in the horizontal direction becomes equal to that when the ½ thinning is performed. As a result, the reading out of the signal charge is performed according to the following procedures. The signal charge is read out as shown in FIG. 13A. The procedures of reading out the signal charge are the same as shown in FIG. 10A. In the next vertical transfer, the signal charge read out on a two-by-two line (two stages) basis is totally transferred similarly to FIG. 10B (see FIG. 13B). The procedures up to this point are the same as in the previous by described procedures.

Figure 13C:
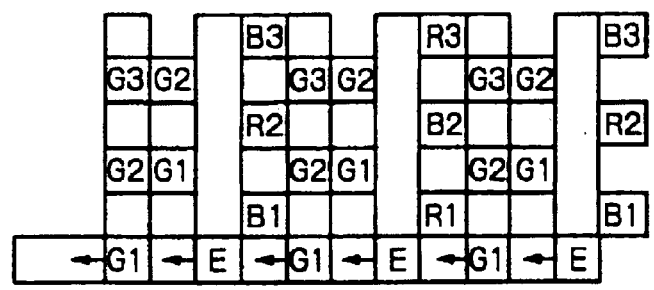

Next, the horizontal transfer will be described. The signal charge is moved by two stages on the transfer path 104d in the horizontal direction. Therefore, in order to keep the signal charge, the horizontal transfer path 104d is constructed so that includes at least two extra transfer devices. As a result, the signal charge "E" of the colors R and B is sent to the region just below the vertical transfer path for transferring the signal charge of the color G (see FIG. 13C). Thereafter, the same vertical transfer as described above is performed. Thus, the signal charge left is transferred downward on two-by-two stage basis. Although the signal charges of "E" of the colors R and B exist in the region just below the vertical transfer path for transferring the signal charge of the color G, without mixing colors even when the signal charge of the color G is transferred thereto because the region just below the vertical transfer path is inherently empty "E" Accordingly, the signal charge of the color G2 fills the region with the signal charges of the colors R and B without producing mixed color.

Figure 13D:
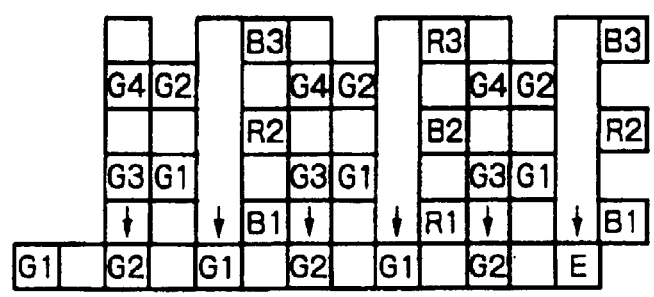
Figure 14:
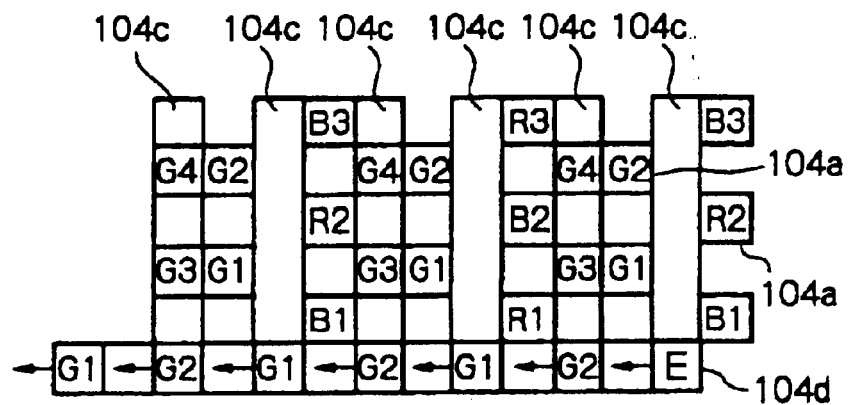
FIG. 14 is a schematic view illustrating the state of the procedure continuing from the procedures of the improved thin down lines of FIGS. 13A–13D.

As a result, the signal charge of the color G for the two lines is held in the horizontal transfer path 104d (see FIG. 13D). In the horizontal transfer after the second vertical transfer, the signal charges G1, G2, G1, G2, . . . of the color G for the two lines are read out from the horizontal transfer path 104d at a time. The signal charges for two lines are read out in a normal period of time for reading out the signal charges for one line (see FIG. 14). Specifically, the ½ thinning in the horizontal direction will be performed.

By processing according to the above described procedures, since the ½ thinning is performed in the horizontal and vertical directions, the time required can be easily shortened to ¼ as long as the whole-pixel reading out.

Figure 15:
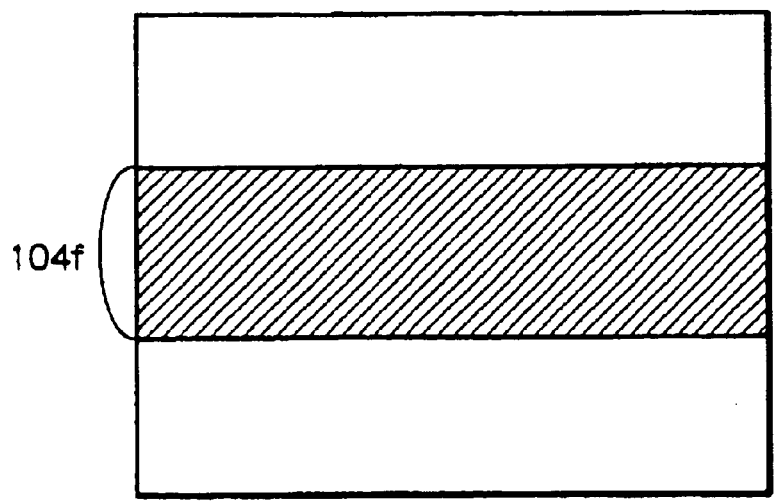
FIG. 15 is a schematic view plan showing a specified range on the photosensitive array to be read out by the image pickup device of FIG. 1A in an AF adjustment in the mode of controlling a light measurement.

Here, the AF control in which a high speed is most required in the controlling operations will be described using the color G, and a method to realize the reading out of the signal charge at a faster speed will be described. As a light measurement range required for performing the AF control, a region near the center, and not the entire, of the photosensitive cell array is satisfactorily used. The region near the center of the array is a region 104f illustrated by the hatching in FIG. 15, and the region 104f occupies an area ranging from at least a quarter to half of the entire array, roughly. The reason why the light measurement range is set to such a region is that an object is often disposed near the center of the imaging field based on experience when a user considers a composition of the imaging field.

In order to read out only the signal charge of the color G in this specified range 104f selectively, it suffices that the signal charge can be read out from the photosensitive cell 104a in this specified range 104f. For this reason, the signal charges to be supplied are separately treated so as to distinguish the specified range 104f from the other ranges. Drive signals $\phi V_{1a}$ and $\phi V_{5a}$ are supplied to the ranges other than the specified range 104f so as to distinguish themselves from the drive signals $\phi V_1$ and $\phi V_5$. On the other hand, drive signals $\phi V_{1b}$ and $\phi V_{5b}$ are supplied to the specified range 104f so as to distinguish themselves from the drive signals $\phi V_{1a}$ and $\phi V_{5a}$. In addition, with respect to the signal lines to which the drive signals $\phi V_{1b}$ and $\phi V_{5b}$ are supplied, the signal line connected to the specified range 104f and the signal lines connected to the remaining ranges are perfectly individually arranged from each other.

An operation in this case will be described with reference to FIGS. 17 to 19 briefly. When the signal charge of the color G is read out from the region 104f near the center of the imaging array, the drive signals $\phi V_{1a}$ and $\phi V_{5a}$ are supplied to the vertical transfer devices V1 and V5 arranged in parallel with the region 104f. These drive signals $\phi V_{1a}$ and $\phi V_{5a}$ are prepared from the vertical timing signals $V_1$ and $V_5$ and the transfer gate signals $TG_{1b}$ and $TG_{5b}$ shown in FIG. 1. Particularly, the transfer gate signals $TG_{1b}$ and $TG_{5b}$ are independently generated, and these timing signals are supplied, separately. In this case, the transfer gate signals $TG_{1a}$ and $TG_{5a}$ are not generated.

Figure 17:
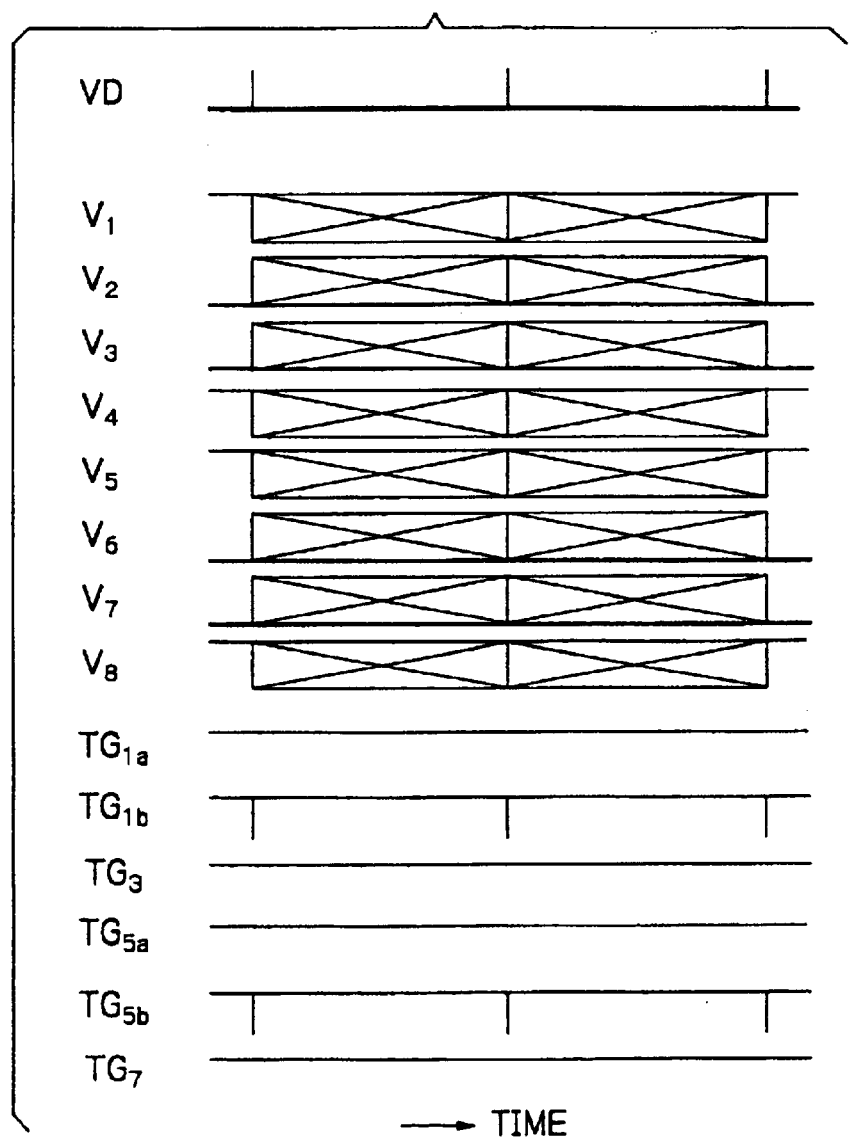
FIG. 17 is a timing chart showing a vertical synchronous signal, a vertical timing signal and a transfer gate signal, which are generated by a signal generator when the image pickup device of FIG. 16 is driven.
Figure 18:
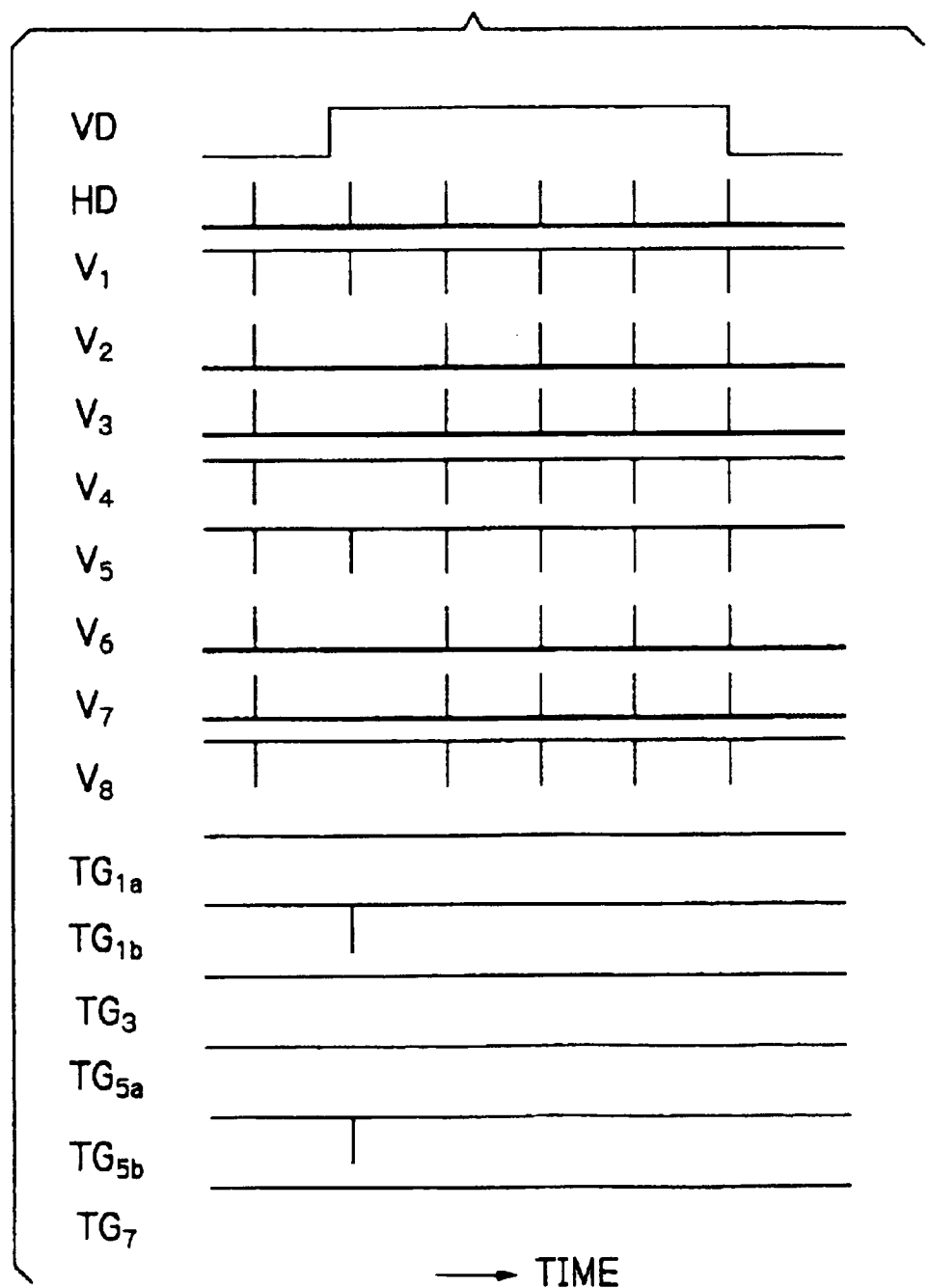
FIG. 18 is a timing chart showing among the vertical synchronous signal, the vertical timing signal and the transfer gate signal with the portion of a leading edge of the vertical synchronous signal of FIG. 17 in an enlarged scale.

Of the time regions including the vertical synchronous signal VD of the FIG. 17 scaled up, the vertical timing signals and the transfer gate signals are illustrated in the timing chart of FIG. 18. The vertical timing signals V1 to V8 are the same as the foregoing vertical timing signals of FIG. 6. Moreover, with respect to the transfer gate signals, the transfer gate signals $TG_1$ and $TG_5$ are used separately for the two regions. In this figure, since the signal charge is read out only from the specified region 104f, the signal charge is read out only for the vertical transfer devices V1 and V5 to which the transfer gate signals $TG_{1b}$ and $TG_{5b}$ are supplied. In the above-described manner, the range for reading out the signal charge is defined.

Figure 19:
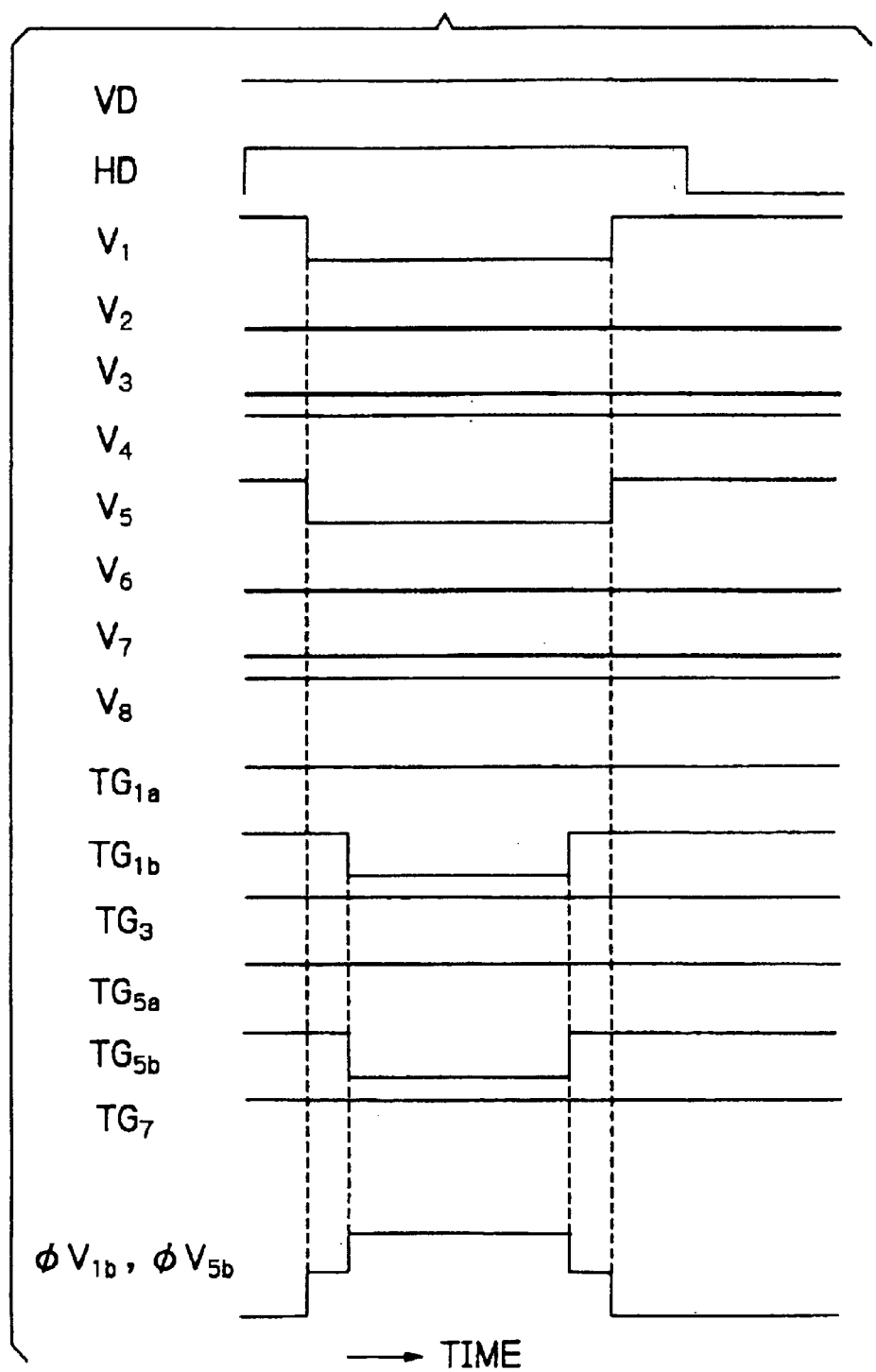
FIG. 19 is a timing chart depicting the vertical synchronous signal, the horizontal synchronous signal, the vertical timing signal, the transfer gate signal, and the drive signal with the portion of a leading edge of the horizontal synchronous signal of FIG. 18 in an enlarged scale.

Moreover, the time region near the transfer gate signals $TG_{1b}$ and $TG_{5b}$ of FIG. 18 are illustrated in an enlarged scale in FIG. 19. The vertical timing signal V1 and the transfer gate signal $TG_{1b}$, and the vertical timing signal $V_5$ and the transfer gate signal $TG_{5b}$ are supplied from the signal generator 120 to the driver 122. The driver 122 uses each of those sets to generate the drive signals $\phi V_{1b}$ and $\phi V_{5b}$. The drive signal 122a is supplied from the driver 122 to the image pickup device 104.

Figure 16:
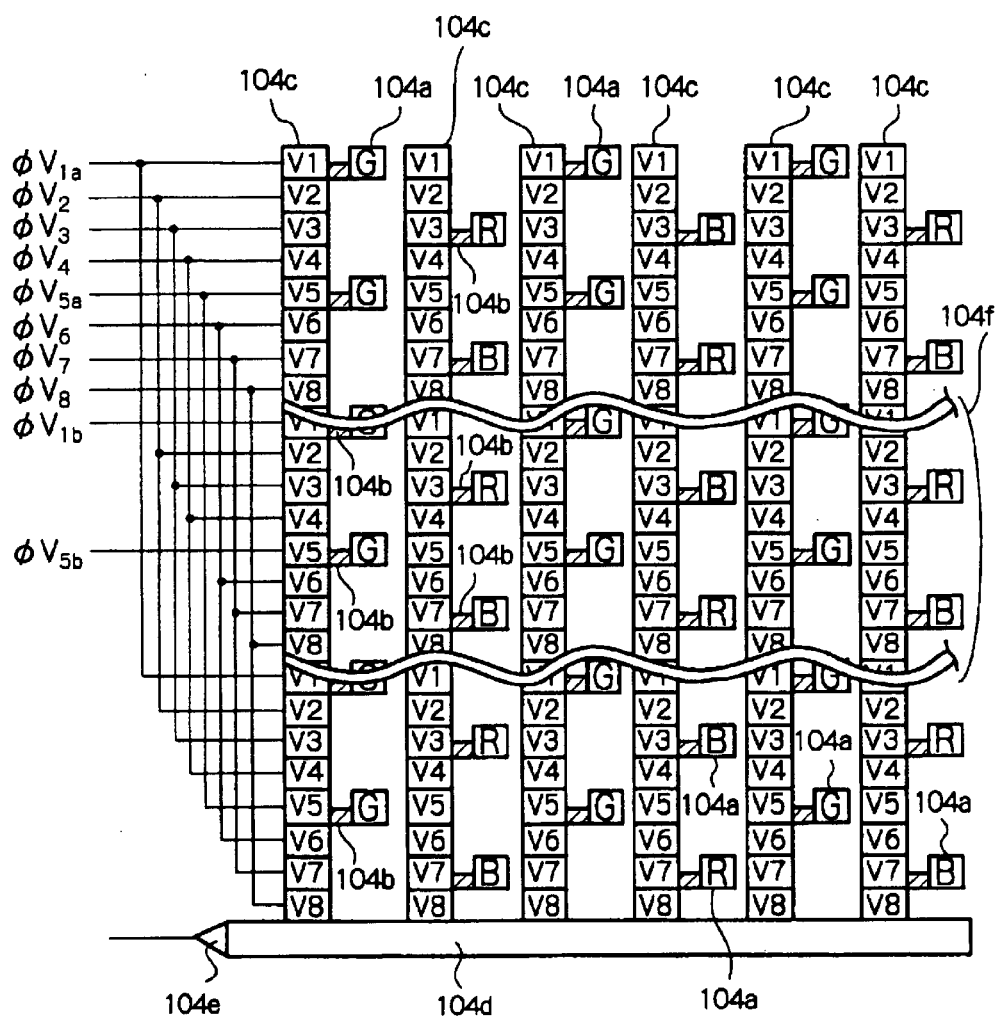
FIG. 16 is a schematic plan view showing the connections of the photosensitive cells, signal reading out gates, and transfer devices on vertical transfer paths and horizontal transfer paths when the signal charge only for a color G is read out from a specified range in FIG. 15, together with the drive signals supplied and them.

As shown in FIG. 16, the signal charge read out only from the specified range is transferred to the vertical transfer devices V1 and V5 forming to the specified range 104f of the vertical transfer paths 104c from the photosensitive cells 104a via the signal reading out gates 104b. Here, in FIG. 16, in order to emphasize that the drive signals $\phi V_{1b}$ and $\phi V_{5b}$ are independently supplied to the vertical transfer devices V1 and V5, the one wiring is shown for each the signals $\phi V_{1b}$ and $\phi V_{5b}$. If other vertical transfer devices V1 and V5 exist in the specified range 104f, as a matter of course the drive signals $\phi V_{1b}$ and $\phi V_{5b}$ are also supplied to those vertical transfer devices V1 and V5.

The signal charge obtained in the above-described manner is vertically transferred. The foregoing improved horizontal transfer performed causes a faster reading out of the signal charge to be performed. For example, the specified range at least required for reading out the signal charge is reduced to a quarter of the entire imaging array, and the ½ thinning in the reading out of the signal charge is performed in the horizontal and vertical directions including the improved horizontal transfer. Thus, the signal charge can be read out only in a time of ¼×½×½=1/16 as long as the time for reading out period the entire pixels in the specified range 104f.

With the above described constitution, the present situation in which the trial to meet the demand for a high-density integration of the pixels obstructs antinomically the high speed reading out of the signal charge can be comparatively easily solved. Thus, the present invention can be used for the AF control which requires the fastest reading out of the signal charge from the image pickup device. Since the image pickup devices serves as a photosensitive sensor, a dedicated light measurement sensor can be omitted.

The entire disclosure of Japanese Patent Application No. 20028/1999 filed on Jan. 28, 1999 including the specification, claims, accompanying drawings and abstract of the disclosure is incorporated herein by reference in its entirety.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A method of reading out an image signal from a plurality of photosensitive cells for performing a photoelectric conversion for incident light arranged two-dimensionally in a photosensitive array for receiving the incident light, the photosensitive cells being arranged obliquely adjacent to each other at positions shifted from each other by a length in row and column directions that is substantially equal to the half of a pitch at which the photosensitive cells are disposed in the row and column directions, wherein an image signal output from an image pickup section for transferring signal charge obtained by the photoelectric conversion by each of the photosensitive cells in response to a drive signal at a predetermined timing is converted to a digital signal, and a picture signal is generated by performing a signal processing on the digital signal, said method comprising the steps of:

setting one of a whole-pixel reading out mode of reading out the signal charge from all of the photosensitive cells of at least three separated colors and a specifying reading out mode of reading out the signal charge from only the photosensitive cells of at least one of the separated colors;

generating the drive signal in response to the mode set, and selectively supplying the drive signal generated;

separating the incident light to the at least three separated colors;

allowing the incident light separated to be incident onto the photosensitive cells;

reading out the signal charge obtained from all of the photosensitive cells in response to the drive signal supplied in the whole-pixel reading out mode, and performing a field shift for the signal charge only from the photosensitive cells corresponding to the at least one separated color among the photosensitive cells in response to the drive signal supplied in the specifying reading out mode;

transferring the signal charge in a column direction, which is transferred in the shift step of reading out, with potential formed in response to the drive signal supplied; and transferring the signal charge, after transferred a line shift to an end of the transfer path in the step of transferring, in a horizontal direction, with potential formed in response to the drive signal supplied, wherein the separated colors are primary colors, red R, green G and blue B, the at least one separated color being G, wherein said step of generating the drive signal comprises the substeps of:

generating a field shift signal which is for reading out the signal charge from the photosensitive cells of the color G of the color filter in said specifying reading out mode;

generating a timing signal of a column transfer which sets a transfer distance to a value equivalent to two lines when the field shift signal is supplied and the signal charge is transferred in the column direction; and generating a timing signal of a row transfer to transfer the signal charge transferred in a row direction and to output the signal charge after performing a line shift by transferring the signal charge in the column direction;

said substeps being iterated to thereby read out the signal charge from the photosensitive cells of the color G.

2. A method in accordance with claim 1, wherein in said substeps of generating a timing signal of a row transfer, the timing signal of the row transfer is generated for transferring the signal charge in the row direction by a transfer distance equivalent to two lines, and being iterated, and in the said row signal supply step of the second time, all of the signal charges of the photosensitive cells of the color G are read out.

3. A method in accordance with claim 2, wherein in said step of generating the drive signal a predetermined region of at least ¼ or more of an effective imaging field is specified to a specified reading out region of the signal charge which is approximately: symmetrical with a center in the column direction when said signal charge is read out from the photosensitive cells of the color G of the color filter in the specifying reading out mode, and the drive signal is supplied to the specified reading out region as the drive signal for an independent specified electrode.

4. A method in accordance with claim 3, wherein said step of reading out the signal charge comprises the substeps of preparing a plurality of transfer devices arranged in the column direction into groups each including eight transfer devices, and performing a field shift only by two electrodes associated with the photosensitive cells of the color filters of the color G among electrodes supplied with the drive signal at a predetermined timing corresponding to the transfer devices, and wherein in the whole-pixel reading out mode, among the photosensitive cells associated with each of groups, the first and fifth transfer devices in the line including the color filters of the color G are supplied and operated with one drive signal, and the third and seventh transfer devices in the line including the color filters of the colors R and B are supplied and operated with another drive signal.

5. A method in accordance with claim 4, wherein in said step of reading out the signal charge, said other drive signal supplied to the first and fifth transfer devices in the specified reading out region in the specifying reading out mode is used as a drive signal for an independent specified electrode, which is distinguished from the one drive signal in the whole-pixel reading out mode.

6. A method in accordance with claim claim 1, wherein in said step of generating the drive signal a predetermined region of at least ¼ or more of an effective imaging field is specified to a specified reading out region of the signal charge which is approximately symmetrical with a center in the column direction when said signal charge is read out from the photosensitive cells of the color G of the color filter in the specifying reading out mode, and the drive signal is supplied to the specified reading out region as the drive signal for an independent specified electrode.

7. A method in accordance with claim 1, wherein said step of reading out the signal charge comprises the substeps of preparing a plurality of transfer devices arranged in the column direction into groups each including eight transfer devices, and performing a field shift only by two electrodes associated with the photosensitive cells of the color filters of the color G among electrodes supplied with the drive signal at a predetermined timing corresponding to the transfer devices, and wherein in the whole-pixel reading out mode, among the photosensitive cells associated with each of groups, the first and fifth transfer devices in the line including the color filters of the color G are supplied and operated with one drive signal, and the third and seventh transfer devices in the line including the color filters of the colors R and B are supplied and operated with another drive signal.

8. A method in accordance with claim 1, wherein in said step of reading out the signal charge, said other drive signal supplied to the first and fifth transfer devices in the specified reading out region in the specifying reading out mode is used as a drive signal for an independent specified electrode, which is distinguished from the one drive signal in the whole-pixel reading out mode.

* * * * *